(12) United States Patent
Savino et al.

(10) Patent No.: US 7,790,907 B2
(45) Date of Patent: Sep. 7, 2010

(54) METHOD OF PRODUCING A URETONIMINE-MODIFIED ISOCYANATE COMPOSITION

(75) Inventors: Thomas Savino, Northville, MI (US); Nikolay Lebedinski, West Bloomfield, MI (US)

(73) Assignee: BASF Corporation, Florham Park, NJ (US)

( * ) Notice: Subject to any disclaimer, the term of this patent is extended or adjusted under 35 U.S.C. 154(b) by 944 days.

(21) Appl. No.: 11/459,159

(22) Filed: Jul. 21, 2006

(65) Prior Publication Data
US 2008/0021176 A1 Jan. 24, 2008

(51) Int. Cl.
*C07D 205/00* (2006.01)

(52) U.S. Cl. .......... 548/952; 548/951; 540/200; 560/26; 560/27; 560/336; 560/334

(58) Field of Classification Search .......... 548/951, 548/952; 540/200, 201; 560/334, 336, 26, 560/27
See application file for complete search history.

(56) References Cited

U.S. PATENT DOCUMENTS

| | | | |
|---|---|---|---|
| 2,726,219 A | 12/1955 | Hill, Jr. | |
| 3,384,653 A | 5/1968 | Erner et al. | |
| 3,394,164 A | 7/1968 | McClellan et al. | |
| 3,394,165 A | 7/1968 | McClellan et al. | |
| 3,462,470 A | 8/1969 | Emery et al. | |
| 3,644,457 A | 2/1972 | Konig et al. | |
| 3,645,979 A | 2/1972 | Liebsch et al. | |
| 3,723,366 A | 3/1973 | Kan | |
| 4,014,935 A * | 3/1977 | Ibbotson | 540/202 |
| 4,055,548 A | 10/1977 | Carleton et al. | |
| 4,085,140 A | 4/1978 | Ibbotson | |
| 4,088,665 A | 5/1978 | Findeisen et al. | |
| 4,115,429 A | 9/1978 | Reiff et al. | |
| 4,120,884 A | 10/1978 | Woerner et al. | |
| 4,243,756 A | 1/1981 | Cenker et al. | |
| 4,260,554 A | 4/1981 | Ohlinger et al. | |
| 4,261,852 A | 4/1981 | Carroll et al. | |
| 4,294,774 A | 10/1981 | Henson et al. | |
| 4,419,294 A | 12/1983 | Feldman et al. | |
| 4,424,288 A | 1/1984 | Patton, Jr. et al. | |
| 4,478,960 A | 10/1984 | Buethe et al. | |
| 4,490,301 A | 12/1984 | Pantone et al. | |

(Continued)

FOREIGN PATENT DOCUMENTS

EP 0516361 A1 2/1992

(Continued)

*Primary Examiner*—Milton I Cano
*Assistant Examiner*—Michael Leonard
(74) *Attorney, Agent, or Firm*—Howard & Howard Attorneys PLLC

(57) ABSTRACT

A method produces a uretonimine-modified isocyanate composition having increased low-temperature tolerance. The method comprises providing a first polyisocyanate composition having two or more isocyanate groups and comprising 4,4'-diphenylmethane diisocyanate (MDI) and reacting the first polyisocyanate composition at a temperature of from about 90° C. to about 115° C. and in the presence of a catalyst such that the isocyanate groups form carbodiimides for forming uretonimine and uretonimine oligomers. The reaction of the first polyisocyanate composition is quenched with a quenching agent to produce an intermediate composition having an intermediate isocyanate value of from about 21.0 to about 26.0. The intermediate composition is blended with a second isocyanate composition to form a stable uretonimine-modified isocyanate composition.

22 Claims, 3 Drawing Sheets

U.S. PATENT DOCUMENTS

| | | |
|---|---|---|
| 4,539,156 A | 9/1985 | Dewhurst et al. |
| 4,539,158 A | 9/1985 | Dewhurst et al. |
| 4,707,502 A | 11/1987 | Rasshofer et al. |
| 4,738,991 A | 4/1988 | Narayan |
| 4,743,626 A * | 5/1988 | Narayan ................ 521/160 |
| 4,743,627 A | 5/1988 | Narayan et al. |
| 4,746,754 A | 5/1988 | Otterbacher et al. |
| 4,937,012 A | 6/1990 | Kan et al. |
| 4,972,004 A | 11/1990 | Randall et al. |
| 4,986,929 A | 1/1991 | Williams |
| 5,319,053 A | 6/1994 | Slack et al. |
| 5,319,054 A | 6/1994 | Slack et al. |
| 5,440,003 A | 8/1995 | Slack |
| 5,525,681 A | 6/1996 | Barron et al. |
| 5,585,452 A | 12/1996 | Hurley et al. |
| 5,610,260 A | 3/1997 | Schmalstieg et al. |
| 5,610,408 A | 3/1997 | Imokawa et al. |
| 5,663,272 A | 9/1997 | Slack et al. |
| 6,120,699 A | 9/2000 | Narayan et al. |
| 6,242,556 B1 | 6/2001 | Markusch et al. |
| 6,482,913 B1 | 11/2002 | Markusch et al. |
| 6,489,503 B1 * | 12/2002 | Narayan et al. ............. 560/26 |
| 6,639,040 B1 | 10/2003 | Slack et al. |
| 6,838,542 B1 | 1/2005 | Slack et al. |
| 6,887,399 B2 | 5/2005 | Slack et al. |
| 7,030,274 B2 * | 4/2006 | Rosthauser et al. ......... 564/252 |
| 2002/0007036 A1 | 1/2002 | Bruchmann et al. |
| 2003/0153715 A1 * | 8/2003 | Pille-Wolf ................... 528/59 |
| 2004/0110915 A1 | 6/2004 | Richter et al. |
| 2005/0020797 A1 | 1/2005 | Pirkl et al. |

FOREIGN PATENT DOCUMENTS

EP          0798299  A1      3/1997

* cited by examiner

METHOD OF PRODUCING A URETONIMINE-MODIFIED ISOCYANATE COMPOSITION

BACKGROUND OF THE INVENTION

1. Field of the Invention

The subject invention relates to a method of producing a uretonimine-modified isocyanate composition having increased low-temperature tolerance and stability.

2. Description of the Related Art

Polyisocyanate compositions including a high concentration of diphenylmethane diisocyanate ("MDI"), particularly 4,4'-MDI are useful for various cellular and non-cellular polyurethane applications. However, a high concentration of 4,4'-MDI often poses a unique processing problem because 4,4'-MDI is normally a solid material at room temperature, i.e., about 25° C. Therefore, the material has to be melted and maintained in order to be useful as a liquid and used in the cellular and non-cellular polyurethane applications.

Unfortunately, MDI compositions having relatively high levels of 4,4'-MDI are also known to have a limited shelf-life due to the formation of diphenylmethane uretdione, otherwise referred to herein as uretdione. Over time, uretdione continues to form in MDI compositions containing 4,4'-MDI. Since uretdione has limited solubility in most MDI compositions, it will tend to precipitate out as a solid. For example, pure 4,4'-MDI compositions maintained at about 43° C. for 14 days have exhibited uretdione concentrations above the generally acceptable saturation concentration of about 0.45%, resulting in the precipitation of uretdione from solution as insoluble white solids. The formation of high concentrations of uretdione renders the MDI compositions substantially useless in many cellular and non-cellular polyurethane applications.

The substantially insoluble uretdione precipitate also causes problems with processing equipment. Specifically, the precipitate clogs the processing equipment, which requires the processing to be stopped. The processing equipment must then be removed from service and cleaned. Even after the processing equipment is cleaned, the precipitate will eventually form and continue to clog the processing equipment resulting in additional service being required. Alternatively, the precipitate may be filtered from the composition. However, additional filtering equipment is required and the removal of the precipitate remains an ongoing problem.

Interestingly, the uretdione formation reaction is both temperature and phase dependent. For example, as the temperature of a 4,4'-MDI composition is increased above about 43° C., the rate of uretdione formation increases. Furthermore, the rate of uretdione formation is accelerated when the MDI is in the solid state as compared with a liquid composition at 43° C., such formation being generally attributed to the alignment of the isocyanate groups in the crystal lattice structure. When the temperature of liquid 4,4'-MDI is lowered and approaches the melting point of about 39 to 40° C., solid 4,4'-MDI begins to form. Along with the formation of solid 4,4'-MDI, insoluble uretdione precipitate rapidly forms, such that even when the temperature is subsequently raised above 43° C., solid particles of uretdione may remain, rendering the product useless for most cellular and non-cellular polyurethane applications.

In view of the temperature and phase dependency of uretdione formation, compositions containing high amounts of 4,4'-MDI are maintained in a liquid state having no solids at a temperature of about 45° C. to minimize the formation of uretdione. However, this desired solids-free liquid state is difficult and costly to maintain and while this temporarily delays the appearance of insoluble precipitate; the uretdione is still being formed at a certain rate. Eventually the concentration of uretdione exceeds the saturation point and insoluble uretdione solids precipitate out of solution.

SUMMARY OF THE INVENTION

The subject invention provides a method of producing a uretonimine-modified isocyanate composition having increased low-temperature tolerance. The method comprises providing a first polyisocyanate composition having two or more isocyanate groups and comprising 4,4'-diphenylmethane diisocyanate (MDI) and reacting the first polyisocyanate composition at a temperature of from about 90° C. to about 115° C. and in the presence of a catalyst such that the isocyanate groups form carbodiimides for forming uretonimine and uretonimine oligomers. The reaction of the first polyisocyanate composition is quenched with a quenching agent to produce an intermediate composition having an intermediate isocyanate value of from about 21.0 to about 26.0. The intermediate composition is blended with a second isocyanate composition to form a stable uretonimine-modified isocyanate composition.

The subject invention provides a low-temperature tolerant uretonimine-modified isocyanate composition that has improved long-term stability as a result of the intermediate composition achieving a desired intermediate isocyanate value. The uretonimine-modified isocyanate composition can be stored at temperatures lower than about 45° C. while still remaining a liquid and while having a reduced tendency to precipitate uretdione as insoluble solids. Additionally, the uretonimine-modified isocyanate composition exhibits improved long term storage stability as a result of forming lower amounts of uretdione. Further, the uretonimine-modified isocyanate composition is able to remain free of solids when stored at about 45° C. and is less likely to form solids thereby resulting in the uretonimine-modified isocyanate composition being more stable.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
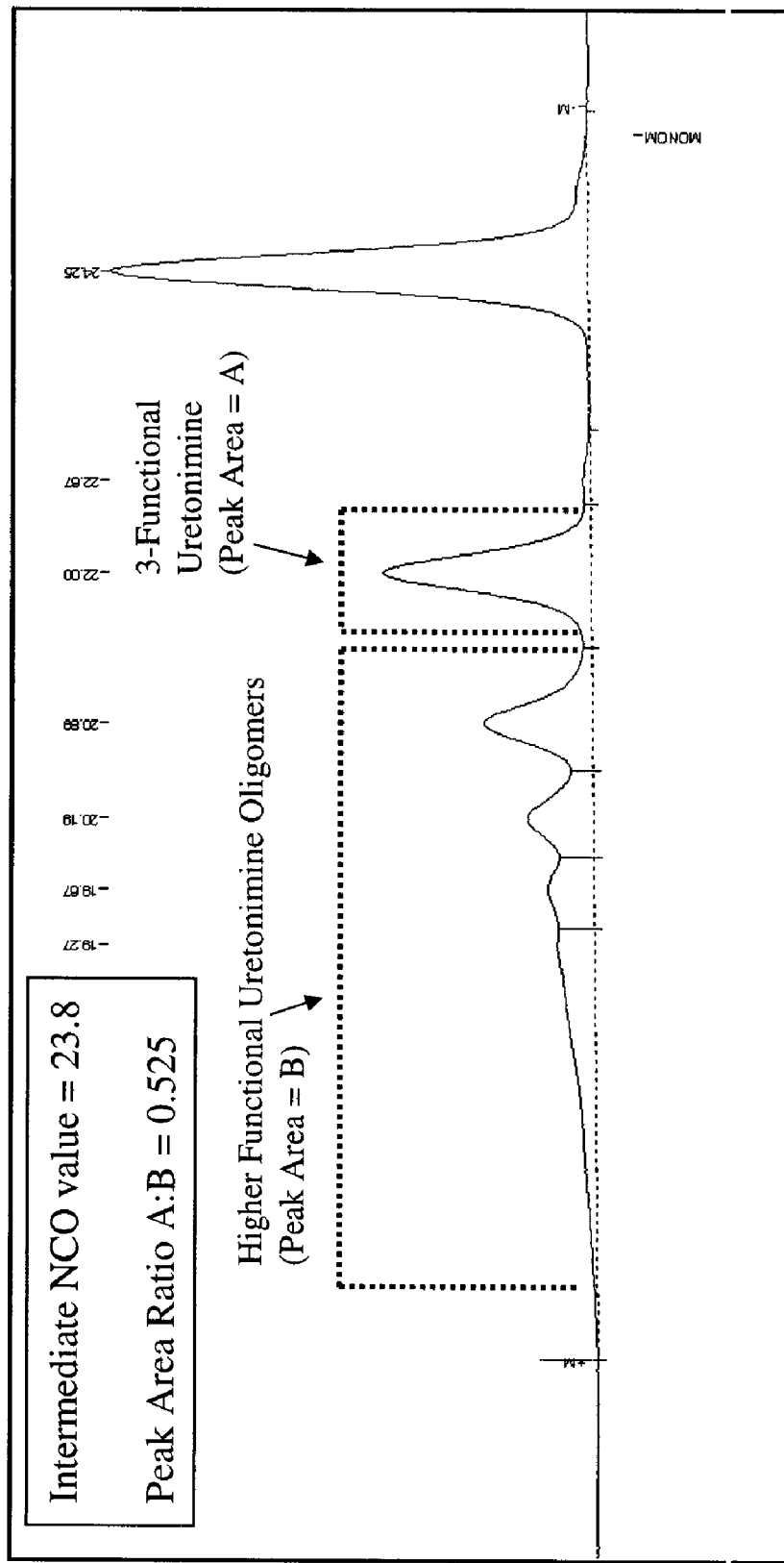
FIG. 1 is a graph of a gel permeation chromatography (GPC) trace of an intermediate composition formed according to the subject invention.

A method of producing a uretonimine-modified isocyanate composition having increased low-temperature tolerance is disclosed. The method of producing the uretonimine-modified isocyanate composition includes the step of providing a first polyisocyanate composition having two or more isocyanate groups and comprising 4,4'-diphenylmethane diisocyanate (MDI), which is also referred to as bis(4-isocyanatophenyl)methane or 4,4'-methylenediphenyl diisocyanate. The 4,4'-MDI is present in an amount of from about 85 to less than 99 parts by weight based on 100 parts by weight of the polyisocyanate composition. Preferably, the 4,4'-MDI is present in an amount of from about 90 to about 99 parts by weight, and more preferably from about 95 to about 99 parts by weight, both based on 100 parts by weight of the first polyisocyanate composition. As used herein, the terms "isocyanate composition" and "composition" are intended to refer to the uretonimine-modified isocyanate composition.

As understood by those of ordinary skill in the art, 4,4'-MDI is normally a solid at room temperature, i.e., about 25° C. The 4,4'-MDI, therefore, has to be melted and maintained at about 45° C. in order to be useful as a liquid. Further, the liquid 4,4'-MDI reacts to form undesirable byproducts when stored over a period of time. This is particularly true when large amounts of 4,4'-MDI are stored in storage tanks either outdoors or indoors. Diphenylmethane uretdione, or uretdione, is formed from the dimerization of two molecules of 4,4'-MDI and is shown below as 1,3-bis(4-(4-isocyanatobenzyl)phenyl)-1,3-diazetidine-2,4-dione. Diphenylmethane uretdione can also react with another molecule of 4,4'-MDI to form an oligomeric uretdione. It is intended that the term "uretdione" may include oligomeric uretdione and mixtures thereof.

ously been known to add small amounts of either the 2,4'-MDI and the 2,2'-MDI to the 4,4'-MDI to improve the stability of the first polyisocyanate composition. For example, commercially pure 4,4'-MDI has about 98 parts by weight 4,4'-MDI and up to 2 parts by weight 2,4'-MDI. The subject invention provides the 2,4'-MDI present in an amount of greater than 1 to about 15 parts by weight based on 100 parts by weight of the first polyisocyanate composition. Preferably, the 2,4'-MDI is present in an amount of from about 1 to about 10 parts by weight, and more preferably, from about 1 to about 5 parts by weight, both based on 100 parts by weight of the first polyisocyanate composition To form the uretonimine-modified isocyanate composition, the first polyisocyanate composition is reacted at a temperature of greater than about 80° C., preferably from about 90° C. to about 115° C., and more preferably from about 100° C. to about 110° C. Most preferably, the temperature of the reaction should be maintained at about 105° C. to help ensure a lower level of uretdione in the final product. If the temperature of the reaction exceeds 115° C., higher amounts of uretdione will be present in the product, resulting in a greater tendency for uretdione to precipitate out as insoluble white solids during handling, transportation or long term storage.

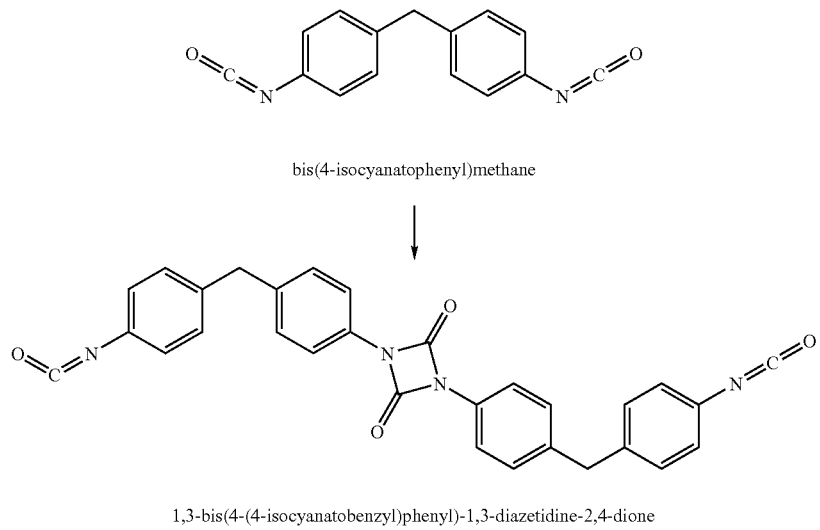

bis(4-isocyanatophenyl)methane 1,3-bis(4-(4-isocyanatobenzyl)phenyl)-1,3-diazetidine-2,4-dione The uretdione or oligomeric uretdione precipitates out from the first polyisocyanate composition as a white solid. The formation of the uretdione is generally irreversible at lower temperatures and once the uretdione is formed, the presence of the uretdione causes various processing problems that may require filtration. For example, processing equipment such as pumps become clogged by the uretdione solids, which requires downtime and cleaning to remove the uretdione from the pumps. Furthermore, uretdione may precipitate out of liquid 4,4-MDI if the temperature drops much below 40° C.

Generally, in addition to the 4,4'-MDI, the first polyisocyanate composition may also comprise 2,4'-MDI, 2,2'-MDI, polymeric MDI, and other isomers. The 2,4'-MDI and the 2,2'-MDI isomers are less reactive than the 4,4'-MDI and when combined with 4,4'-MDI in certain ratios affords compositions that are liquids at room temperature. It has previ- The temperature of the first polyisocyanate composition may be raised using standard techniques, such as heat baths, ovens, burners, etc.

Lowering the temperature of the reaction also slows the reaction rate for carbodiimide formation as well as formation of uretonimine. A slow reaction rate can lead to long reaction times, which results in the formation of higher amounts of undesirable uretdione. To achieve the desired results for the uretonimine-modified isocyanate composition, the reaction rate is increased while maintaining the temperature between about 90° C. to about 115° C.

The first polyisocyanate composition is also reacted in the presence of a catalyst such that the isocyanate groups of MDI react to first form carbodiimides. The catalyst is present in amounts of from about 2 to about 500 parts per million. The amount of catalyst depends on the reaction temperature such that the reaction temperature remains near the desired reaction temperature and that the reaction occurs in a desired amount of time. Preferably, the catalyst is present in an amount of from about 5 to about 100 parts per million. As appreciated by those of ordinary skill in the art, the catalyst may participate in the reaction and may also remain in the uretonimine-modified isocyanate composition. Alternatively, the catalyst may be removed or filtered. The catalyst catalyzes the formation of the carbodiimides and does not substantially interact with the reaction of the carbodiimides and the first polyisocyanate composition or the uretonimines.

The uretonimine-modified compositions of the present invention may be prepared using any of the known carbodiimide-promoting compounds as the catalyst. The catalyst is selected from the group of phospholene, phospholene oxide, phospholidine, phospholidine oxide, phosphate esters, phosphine oxides and mixtures thereof. One example of a phospholidine includes 1-phenyl phospholidine and one example of a phospholidine oxide includes 1-phenyl-phospholidine-1-oxide. Other suitable catalysts include phosphate esters, such as triethylphosphate, and phosphine oxides, such as tributylphosphine oxide.

Preferred catalysts are phospholene oxides, and most preferred are phospholene 1-oxides having the following formula:

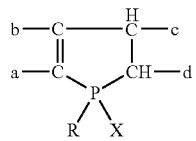

Or the isomeric formula

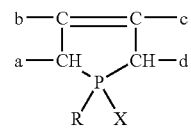

wherein a, b, c and d are each selected from one of hydrogen or hydrocarbyl from 1 to 12 carbon atoms inclusive, R is selected from one of lower alkyl or aryl and X is selected from one of oxygen or sulfur.

Representative compounds within this class of catalysts are 3-methyl-1-phenyl-3-phospholene-1-oxide, 3-methyl-1-phenyl-2-phospholene-1-oxide, 1-methyl-3-phospholene-1-oxide, 1-methyl-2-phospholene-1-oxide, 1-ethyl-3-phospholene-1-oxide, 1-ethyl-2-phospholene-1-oxide 1-phenyl-3-phospolene-1-oxide, and 1-phenyl-2-phospolene-1-oxide. Also, polymer bound catalysts, and especially polymer bound phospholene oxides, may be employed in the subject invention.

In addition, co-catalysts may also be used to ensure the desired reaction temperature and time. It is to be appreciated that the co-catalyst increases the rate of reaction and functions as a catalyst, however, the co-catalyst may not typically be a catalyst. In other words, the co-catalyst may catalyze the reaction when in the presence of the catalyst and not catalyze the reaction if the catalyst is not present. The co-catalyst is added in an amount of from about 50 to about 1500 parts per million, preferably from about 100 to about 1250, more preferably from about 200 to about 1000 parts per million. It is to be further appreciated that the co-catalyst may be selected from typical catalyst well known to those skilled in the art. The co-catalyst is preferably a phosphite, comprised of aliphatic, aromatic, or mixed aliphatic and aromatic groups. Examples of preferred co-catalysts include triphenyl phosphite, tributyl phosphite, phenyl diisodecyl phosphite, and diphenyl isodecyl phosphite.

In addition, hindered phenol antioxidants, and especially 2,6-di-tert-butyl-hindered phenolic antioxidants, may be present in the first polyisocyanate composition. Examples of phenolic antioxidants include 2,6-di-tert-butyl-4methylphenol, also known as BHT, and 3-(3,5-di-tert-butyl-4-hydroxyphenyl)propanoate, available commercially as Irganox® 1076. Hindered phenolic antioxidants are commonly used as stabilizers for commercial first polyisocyanate compositions, and thus may be present when employed in forming the uretonimine-modified isocyanate composition of the subject invention. If the hindered phenolic antioxidants are not present in the first polyisocyanate composition, then they may also be added before or after the reaction to form carbodiimide, uretonimine, and uretonimine oligomers.

It is to be appreciated by those of ordinary skill in the art that only a portion of the isocyanate groups may react to form the carbodiimides, however, all isocyanate groups may react. The carbodiimides can then react further with the isocyanate groups of unreacted MDI to form uretonimine.

Alternatively, the carbodiimide may also react with the isocyanate group of another molecule of uretonimine instead of unreacted MDI, to form a higher molecular weight, uretonimine oligomers. For clarity, the term "uretonimine" is intended to mean 3-functional, six ring uretonimine oligomer because there is a single uretonimine group, as shown below. Additionally, "uretonimine oligomers" is intended to mean more than 3 functional groups, which have more than a single uretonimine group, as shown below.

In addition to reacting with MDI, other mono-, di-, tri-, tetra-isocyanates and other aromatic, aliphatic, and cycloaliphatic polyisocyanates and combinations thereof may react with the MDI. Examples of suitable monoisocyanates include phenyl isocyanates and cyclohexyl isocyanate. Examples of suitable diisocyanates include m-phenylene diisocyanate, 2,4-toluene diisocyanate, 2,6-toluene diisocyanate, mixtures of 2,4- and 2,6-toluene diisocyanate, hexamethylene diisocyanate, tetramethylene diisocyanate, cyclohexane-1,4-diisocyanate, hexahydrotoluene diisocyanate (and isomers), isophorone diisocyanate, hydrogenated diphenylmethane diisocyanate, naphthalene-1,5diisocyanate, 1-methoxyphenyl-2,4-diisocyanate, 4,4'-biphenylene diisocyanate, 3,3'-dimethoxy-4,4'-biphenyl diisocyanate, 3,3'-dimethyl-diphenylmethane4,4'-diisocyanate, and tetramethylxylylene diisocyanate. Examples of suitable triisocyanates include 4,4',4"-triphenylmethane triisocyanate and toluene 2,4,6-triisocyanate. Examples of suitable tetraisocyanates include 4,4'-dimethyldiphenylmethane-2,2',5,5'-tetraisocyanate and examples of suitable polymeric polyisocyanates include polymethylene polyphenylene polyisocyanate.

The uretonimines formed in the reaction are a mixture that includes 3-functional, six ring uretonimine, 4-functional, ten ring uretonimine, and 5-functional, fourteen ring uretonimine. One possible reaction of the 4,4'-MDI while in the presence of the catalyst is shown below, which results in the formation of the 3-functional, six ring oligomer, 1,3-bis(4-(4-isocyanatobenzyl)phenyl)-4-(4-(4-isocyanatobenzyl)phenylimino)-1,3-diazetidin-2-one. The first step in this reaction is the formation of a carbodiimide intermediate, N,N'-methanediylidenebis-4-(4-isocyanatobenzyl)aniline from two molecules of 4,4-MDI. The carbodiimide may react further with another molecule of 4,4'-MDI to form a 3-functional, six ring uretonimine.

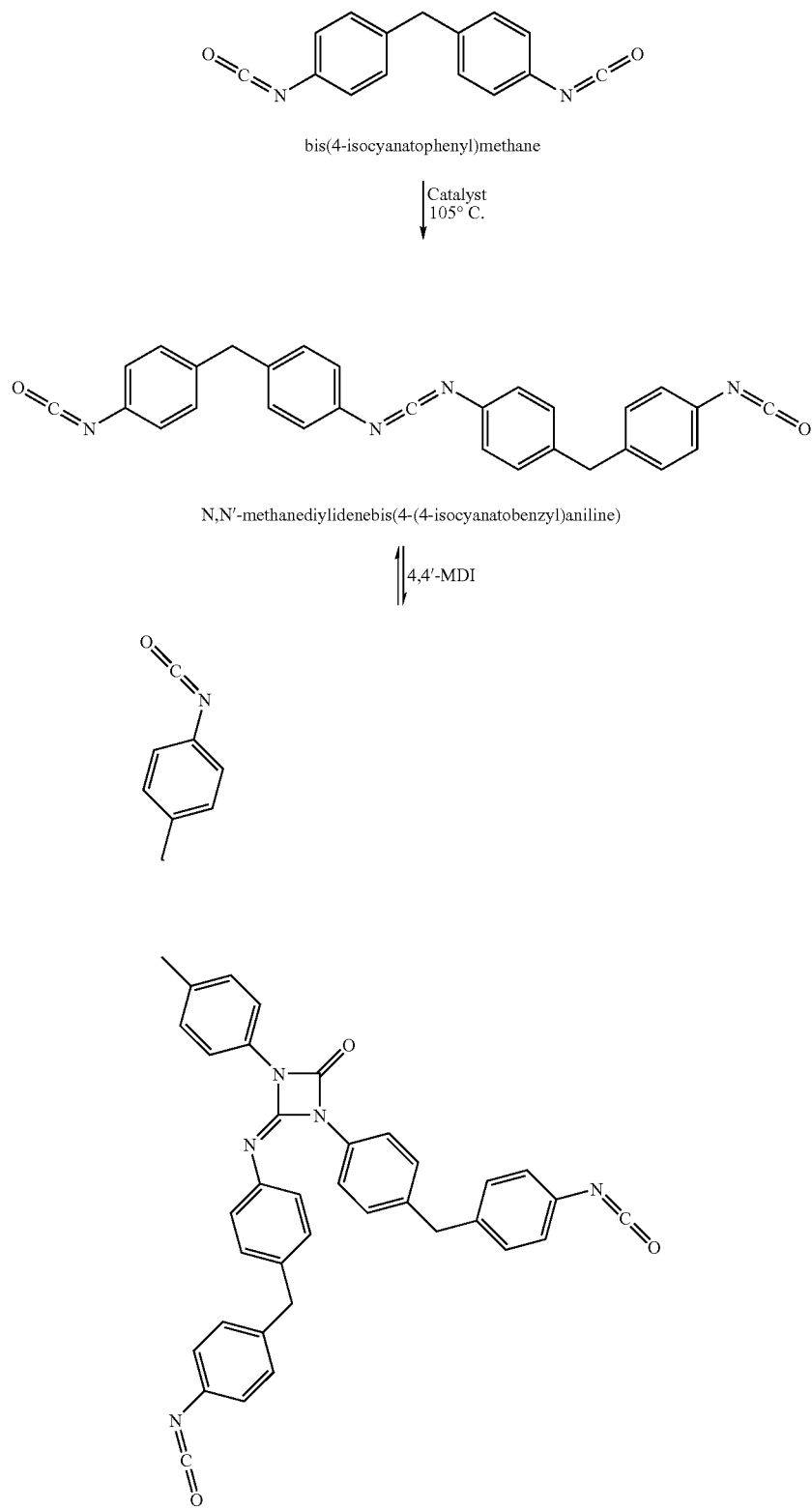
bis(4-isocyanatophenyl)methane
Catalyst
105° C.
N,N'-methanediylidenebis(4-(4-isocyanatobenzyl)aniline)
4,4'-MDI
1,3-bis(4-(4-isocyanatobenzyl)phenyl)-4-(4-(4-isocyanatobenzyl)phenylimino)-1,3-diazetidin-2-one
Below is an example of the 4-functional, ten ring uretonimine oligomer that may be formed as a result of the 3-functional uretonimine oligomer reacting with the carbodiimide of 4,4'-MDI.

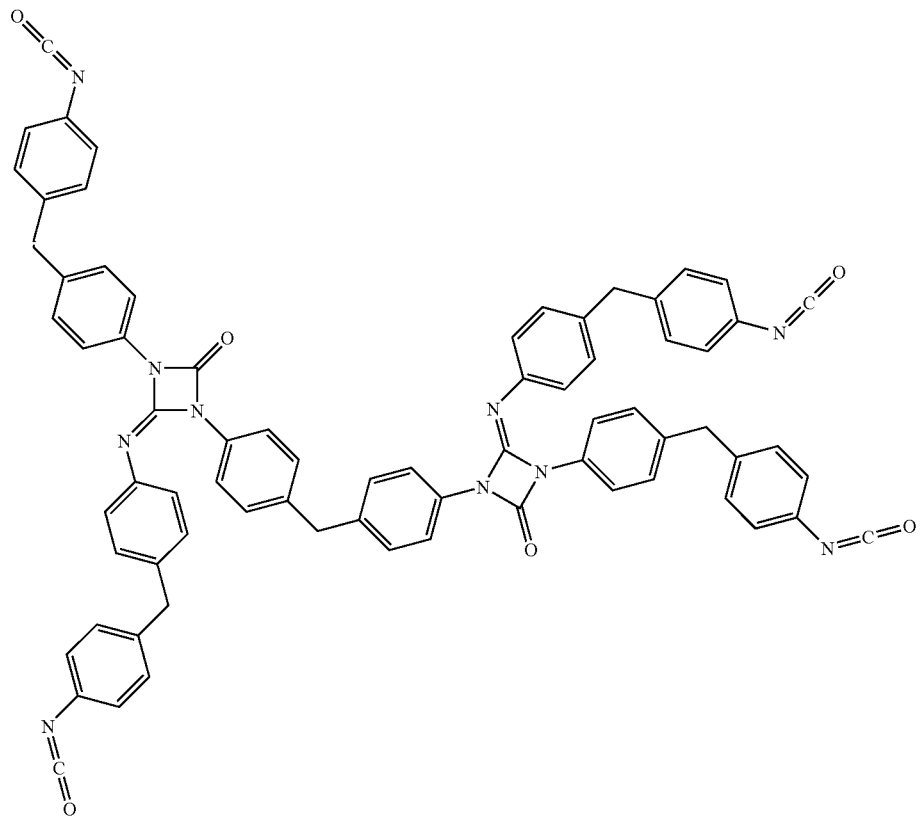
1-(4-(4-isocyanatobenzyl)phenyl)-3-(4-(4-(3-(4-(4-isocyanatobenzyl)phenyl)-2-(4-(4-isocyanatobenzyl)phenylimino)-
4-oxo-1,3-diazetidin-1-yl)benzyl)phenyl)-4-(4-(4-isocyanatobenzyl)phenylimino)-1,3-diazetidin-2-one
Below is an example of the 5-functional, fourteen ring uretonimine oligomer that may be formed as a result of the 4-functional uretonimine oligomer reacting with the carbodiimide of 4,4'-MDI.
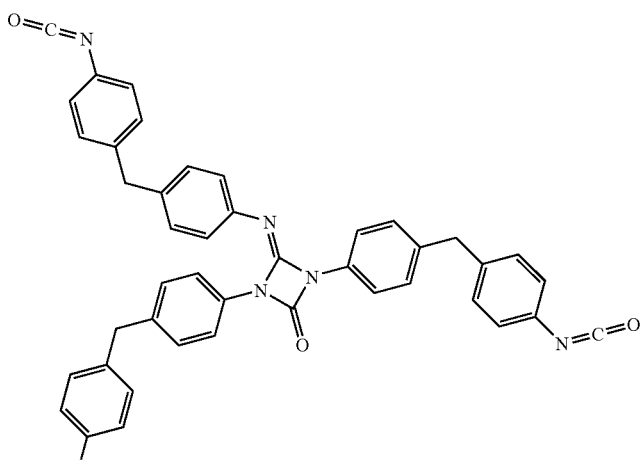

-continued

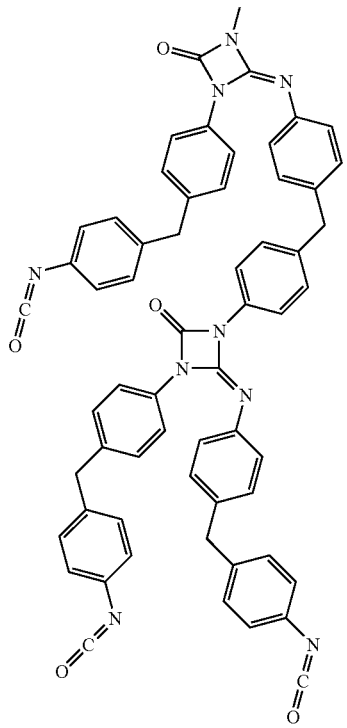

1-(4-(4-isocyanatobenzyl)phenyl)-3-(4-(4-(3-(4-(4-isocyanatobenzyl)phenyl)-2-(4-(4-(3-(4-(4-isocyanatobenzyl)phenyl-2-(4-(4-isocyanatobenzyl)phenylimino)-4-oxo-1,3-diazetidin-1-yl)benzyl)phenylimino)-4-oxo-1,3-diazetidin-1-yl)benzly)phenyl)-4-(4-(4-isocyanatobenzyl)phenylimino)-1,3-diazetidin-2-one The longer the reaction proceeds, the larger the amount of the higher-functional uretonimine oligomers, i.e., greater than 3-functional, that is formed. As more MDI is consumed and converted to uretonimines, the isocyanate value of the first polyisocyanate composition is reduced because reactive isocyanate groups are reacted with one another. As understood by those of ordinary skill in the art, the isocyanate value refers to a weight percentage of reactive isocyanate groups in the first polyisocyanate composition. The isocyanate value can be determined by the following, well-known equation:

$$\text{Isocyanate Value} = \%\ NCO\ \text{groups} = \frac{42 \times f}{Mw} \times 100,$$

wherein 42 is the molecular weight of the NCO groups, $f$ is functionality and refers to the number of reactive groups in the first polyisocyanate composition, and Mw is the molecular weight of the polyisocyanate. For example, 4,4'-MDI has a molecular weight of 250.26 and a functionality of 2 resulting in the isocyanate value, or % NCO groups, of 33.6.

The reaction of the first polyisocyanate composition is quenched with a quenching agent. The quenching agent quenches the reaction by deactivating the catalyst, thereby reducing or preventing further reaction of the 4,4'-MDI to form carbodiimide and further to form uretonimine. The quenching agent also stabilizes the uretonimine-modified isocyanate composition over increased storage periods at temperatures above 30° C.

The quenching agent must be sufficiently strong to prevent the reactivation of the catalyst and is used in an amount based upon the amount of catalyst used, the reactivity of the first polyisocyanate composition, and the strength of the quenching agent. The quenching agent is used in an amount of from about 1 to about 20 parts by weight based per part by weight of the catalyst used, preferably from about 2 to about 10 parts by weight. The quenching agent may also be present in an amount of from about 1 to about 500 parts per million based on the uretonimine-modified isocyanate composition.

The quenching agent is preferably an acid or an acid generator. Useful quenching agents include aliphatic and aromatic acid chlorides such as acetyl chloride, benzoyl chloride and benzenesulfonyl chloride, oxalyl chloride, adipyl chloride, sebacyl chloride and carbonyl chloride. Also inorganic acids such as perchloric acid, hydrochloric acid, peracetic acid, acetic acid, oxalic acid, citric acid, formic acid, ascorbic acid, benzoic acid, and sulfuric acid, and strong organic acids such as trifluoromethane sulfonic acid, toluenesulfonic acid, and trifluoroacetic acid may be employed. Chloroformates may also be employed such as methyl chloroformate, ethyl chloroformate, isopropyl chloroformate, n-butyl chloroformate, isopropyl chloroformate, n-butyl chloroformate, sec-butyl chloroformate and diethylene glycol bis chloroformate. Most preferably, the quenching agent is selected from the group of trifluoromethanesulfonic acid, perchloric acid, and mixtures thereof.

The reaction is quenched to produce a stable intermediate composition having an intermediate isocyanate value of from about 21.0 to about 26.0. Preferably, the intermediate isocyanate value is from about 22.0 to about 25.0, and more preferably from about 23.0 to about 25.0. Achieving the intermediate isocyanate value within these ranges has a surprising impact on the stability of the uretonimine-modified isocyanate composition, such that when the intermediate isocyanate value is outside of these ranges, the stability of the uretonimine-modified isocyanate composition is sacrificed.

Figure 2:
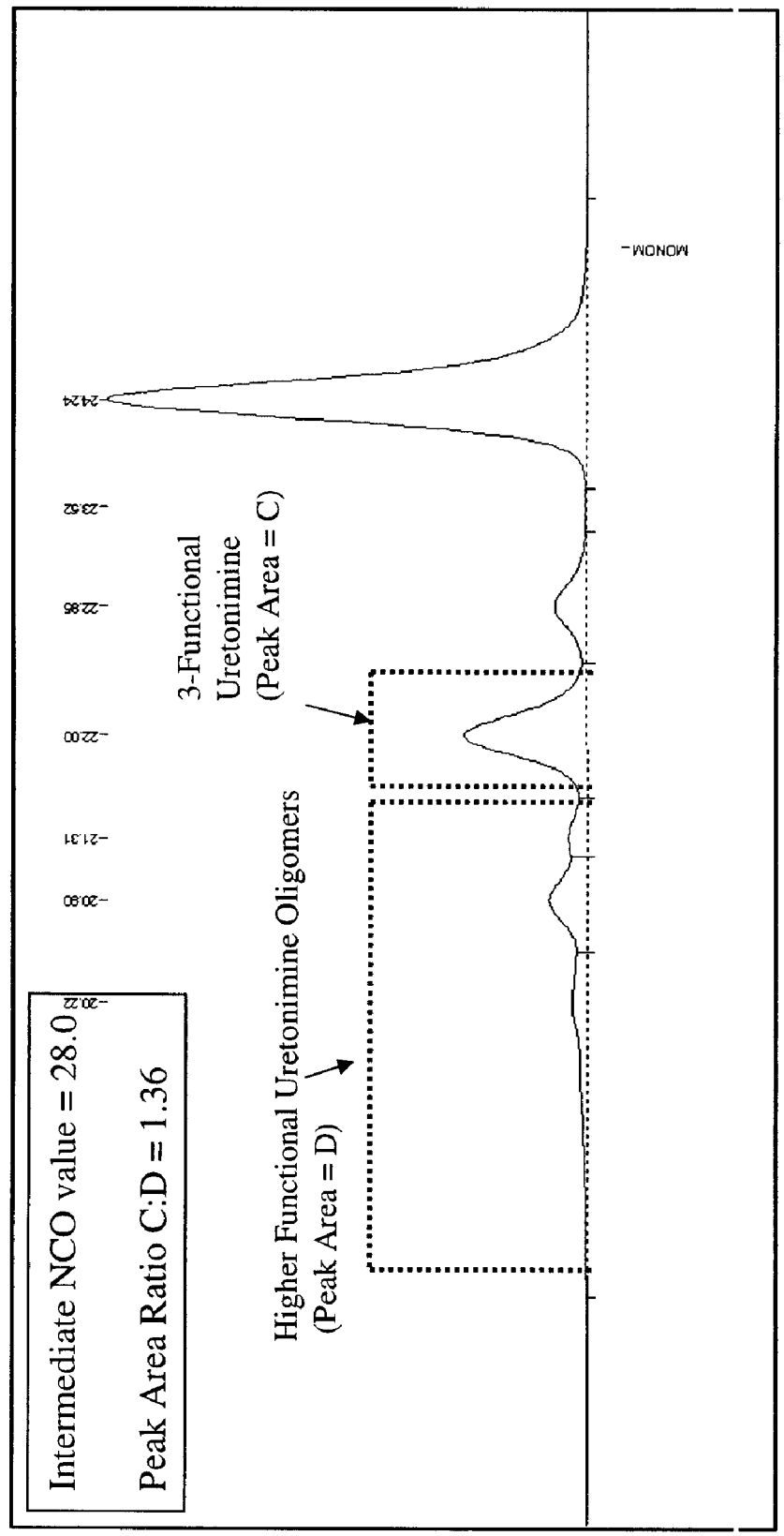
FIG. 2 is a graph of a GPC trace of a intermediate composition formed according to a comparative example.

The uretonimine-modified isocyanate composition also has a ratio of 3-functional uretonimine oligomers to higher-functional uretonimine oligomers of from about 0.15 to about 0.87. Preferably, the ratio of 3-functional uretonimine oligomers to higher-functional uretonimine oligomers is about 0.27 to about 0.70. More preferably, the ratio is about 0.41 to about 0.55. The ratio of 3-functional uretonimine oligomers to higher-functional uretonimine oligomers is determined by analyzing the uretonimine-modified isocyanate composition with gel permeation chromatography (GPC). Referring to FIG. 1, a GPC trace is shown for an intermediate composition formed according to the subject invention and having an intermediate isocyanate value of about 23.8. The right most peak shown in the traces represents 4,4'-MDI present in the intermediate composition. The 3-functional uretonimine appears at a retention time of about 22 minutes. The remaining peaks to the left of the 3-functional uretonimine peak represent the higher-functional oligomers, which appear at a retention time from about 17 minutes to about 21.5 minutes. The ratio of 3-functional uretonimine oligomers to higher-functional uretonimine oligomers is determined from the GPC trace by measurement of the area under the peaks. In FIG. 1, the ratio of 3 functional uretonimine to higher functional uretonimine oligomers is about 0.525. FIG. 2 is a GPC trace for a comparative example that was formed having an intermediate isocyanate value of 28.0. The ratio of 3-functional uretonimine to higher functional uretonimine oligomers is about 1.36. The comparative example does not produce a uretonimine-modified isocyanate composition that is as stable as the subject invention as will be illustrated in the following examples.

Figure 3:
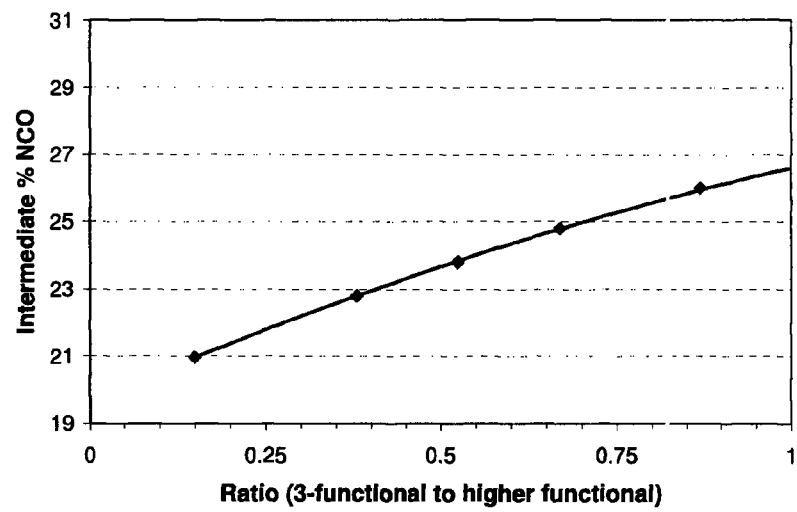
FIG. 3 is a graph of uretonimine ratio versus intermediate isocyanate value of the intermediate composition for the subject invention.

The ratio of 3-functional uretonimine oligomers to higher-functional uretonimine oligomers depends upon the intermediate isocyanate value of the intermediate composition. As the intermediate isocyanate value decreases the ratio of 3-functional uretonimine oligomers to higher-functional uretonimine oligomers decreases. FIG. 3 illustrates a relationship of this ratio to the intermediate isocyanate value. The range of the ratio from 0.5 to 0.15 has been extrapolated based upon the trend line from the range of the ratio from 0.525 to 1.89.

After the intermediate composition reaches the desired intermediate isocyanate value and the reaction is quenched, a second polyisocyanate composition may be added to the intermediate composition to form the uretonimine-modified isocyanate composition. The second polyisocyanate composition may be similar to the first polyisocyanate composition described above or it may include pure 4,4'-MDI, 2,4'-MDI, 2,2'-MDI, polymeric MDI, or any other isocyanate composition. The second polyisocyanate composition is added in weight ratio of from about 1:9 to about 1:99. In other words, the intermediate composition is present in an amount of about 1 to about 10, preferably from about 2.5 to about 7.5, and most preferably about 5, parts by weight and the second polyisocyanate composition is present in an amount of from about 90 to about 99, preferably from about 92.5 to about 97.5, and most preferably about 95, parts by weight based on the total parts of the mixture of the intermediate composition and the second polyisocyanate composition.

The final isocyanate value in the final product may be adjusted by modifying the amount of the second polyisocyanate composition that is added to the intermediate composition. As more of the second polyisocyanate composition is added, the final isocyanate value increases. It is to be appreciated that the ratio of the uretonimine to uretonimine oligomers may remain substantially the same if the second polyisocyanate composition does not include any or little uretonimine or uretonimine oligomers. However, if the second polyisocyanate includes uretonimine or uretonimine oligomers, then the ratio may be adjusted accordingly.

It is desired to have a final composition with a high concentration of 4,4'-MDI that can be used in applications requiring the use of nearly pure 4,4'-MDI. For reference, the isocyanate value of pure 4,4'-MDI is about 33.6%. The uretonimine-modified isocyanate composition may have the final isocyanate value of from about 29.5 to about 33.5. Preferably the final isocyanate value of the uretonimine-modified isocyanate composition of the present invention is from about 32.0 to about 33.5. More preferably the final isocyanate value is from about 32.5 to about 33.0.

The subject invention may also add a third polyisocyanate composition to the intermediate composition prior to adding the second polyisocyanate composition. Preferably, the first polyisocyanate composition and the third polyisocyanate composition are the same or similar, however, the third composition may be different depending upon the desired properties of the intermediate composition. The third polyisocyanate composition is added an amount sufficient to produce the intermediate composition having an intermediate isocyanate value of from about 24.5 to about 25.5. In other words, once the reaction is quenched, the intermediate composition has an initial intermediate isocyanate index. The third polyisocyanate composition is added and the intermediate composition then has a final intermediate isocyanate index. The amount of the third isocyanate composition added depends upon the initial intermediate isocyanate index and the desired final intermediate isocyanate index. If the initial intermediate isocyanate index is satisfactory, then no third isocyanate composition may be added. Preferably, if needed, the third polyisocyanate composition is added prior to the intermediate composition being mixed with the second isocyanate composition to ensure stability.

As more catalyst is added to increase the rate of reaction of the 4,4'-MDI and to maintain the lower reaction temperature of about 105° C., more quenching agent is required to deactivate the catalyst. Adding the quenching agent in large amounts impacts the final uretonimine-modified isocyanate composition and impacts products manufactured therefrom. Therefore, it has been discovered that a co-catalyst, different than the catalyst, may be added to the polyisocyanate composition to increase the rate of reaction and to achieve the desired intermediate isocyanate value and ratio of uretonimine oligomers without requiring larger amounts of the quenching agent. Generally, the co-catalyst has a lower reactivity or strength than that of the catalyst. Additional quenching agent is not needed to deactivate the co-catalyst. Further, the co-catalyst may be added in larger amounts than the catalyst and not require additional quenching agent to deactivate the co-catalyst.

The co-catalyst is added in an amount of from about 50 to about 1500 parts per million, preferably from about 100 to about 1250, more preferably from about 200 to about 1000 parts per million. The co-catalyst is preferably a phosphite, comprised of aliphatic, aromatic, or mixed aliphatic and aromatic groups. Examples of preferred co-catalysts include triphenyl phosphite, tributyl phosphite, phenyl diisodecyl phosphite, and diphenyl isodecyl phosphite.

The following examples illustrate the production of the uretonimine-modified isocyanate compositions, according to the subject invention and illustrating certain properties of the uretonimine-modified isocyanate compositions, as presented herein, are intended to illustrate and not limit the invention.

EXAMPLE 1

An intermediate composition is prepared from a mixture of 499.93 parts of about 98% 4,4'-MDI and about 2% 2,4'-MDI isomers and other isomers (herein after "MDI blend") and 0.05 parts of phospholene oxide catalyst in a 5% solution of methyl ethyl ketone. The mixture is maintained at 106° C. for 3 hours 10 minutes in a 500 mL, 3-necked round-bottom flask with overhead stirrer, drying tube and digital temperature controller. Next, 0.02 parts of phospholene oxide in a 5% solution of methyl ethyl ketone are added and the reaction mass is maintained at the same temperature for 1.5 hours. Thereafter, 0.525 parts of 10% solution of trifluoromethane sulfonic acid in diisodecyladipate is added to deactivate the catalyst. The initial intermediate isocyanate value was 23.5% by weight. Additional MDI blend is added to the reaction mass to a final intermediate isocyanate value of 25.0% by weight. The product is cooled and stored at ambient conditions.

EXAMPLE 2

An intermediate isocyanate is prepared from a mixture of 499.93 parts of MDI blend and 0.07 parts of a 5% solution of phospholene oxide catalyst in methyl ethyl ketone. The mixture is maintained at 106° C. for 3 hours in 500 mL, 3-necked round-bottom flask equipped with an overhead stirrer, drying tube and digital temperature controller. Thereafter, 0.525 parts of a 10% solution of trifluoromethane sulfonic acid in diisodecyladipate was added to deactivate the catalyst. The initial intermediate isocyanate value was 24.2% by weight. Additional MDI blend is added to the reaction mass to get the final intermediate isocyanate value of 25.0% by weight. The product was cooled and stored at ambient conditions.

EXAMPLE 3

An intermediate isocyanate is prepared from a mixture of 499.93 parts of MDI blend and 0.05 parts of phospholene oxide catalyst in methyl ethyl ketone. The mixture is maintained at 106° C. for 3 hours in 500 mL, 3-necked round-bottom flask with overhead stirrer, drying tube and digital temperature controller. Thereafter, 0.525 parts of 10% solution of trifluoromethane sulfonic acid in diisodecyladipate is added to deactivate the catalyst. The initial intermediate isocyanate value is 24.9% by weight and no additional MDI blend is necessary. The product is cooled and stored at ambient conditions.

COMPARATIVE EXAMPLE 1

A sample is obtained of LUPRANATE® 5143 Isocyanate, commercially from BASF Corporation, with an intermediate isocyanate value of 26.5% by weight, and a final isocyanate value of about 29.2% by weight.

COMPARATIVE EXAMPLE 2

A sample is obtained of LUPRANATE® 219 Isocyanate, commercially from BASF Corporation, with an intermediate isocyanate value of 27.5% by weight, and a final isocyanate value of about 29.5% by weight

EXAMPLE 4

A uretonimine-modified isocyanate composition is formed from a blend of 95.41% by weight of MDI blend and 4.59% by weight of the intermediate isocyanate described in Example 1 was prepared by mixing at 50° C. The final isocyanate value of the uretonimine-modified isocyanate composition was 32.9% by weight.

EXAMPLES 5-8

Four more uretonimine-modified isocyanate compositions are prepared from the MDI blend and the intermediate isocyanates of Examples 2 and 3 and Comparative Examples 1 and 2 at 50° C. The compositional information on these blend compositions is given in Table 1.

TABLE 1

Compositions and Specifications of Blends

| | | Isocyanate Value | | |
|---|---|---|---|---|
| | Composition | Initial Intermediate Isocyanate | Final Intermediate Isocyanate | Uretonimine-modified Isocyanate Composition |
| Ex. 4 | 95.5% MDI blend + 4.5% Example 1 | 23.5 | 25.0 | 32.8 |
| Ex. 5 | 95.41% MDI blend + 4.59% Example 2 | 24.2 | 25.0 | 32.9 |
| Ex. 6 | 95.3% MDI blend + 4.7% Example 3 | 24.9 | 24.9 | 32.7 |
| Ex. 7 | 90.95% MDI blend + 9.05% Comparative Example 1 | 26.5 | 29.2 | 32.8 |
| Ex. 8 | 90% MDI blend + 10% Comparative Example 2 | 27.5 | 29.5 | 32.9 |

Low Temperature Stability Testing

The five uretonimine-modified isocyanate compositions (Examples 4-8) are tested for low temperature freeze stability using a VWR Brand Low Temperature Incubator, with a temperature range of −5° C. to +45° C., and a temperature accuracy of ±0.5° C. @20° C. Samples are placed in 100 ml glass bottles, which are then placed in the incubator at 30° C. Samples are checked once every day for evidence of solids formation. Next, the temperature in the incubator is lowered to 28° C., and the samples are subjected to this temperature for 7 days. This is repeated at 26° C., 25° C., and 24° C., until all samples showed evidence of solids formation. The stability results are shown in Table 2.

TABLE 2

Low Temperature Stability

| Example | Temperature & Day Solids were First Observed | Total # of Days without Solids |
|---|---|---|
| 4 | Solids formed after 4 days at 24° C. | 30 |
| 5 | Solids formed after 2 days at 24° C. | 28 |
| 6 | Solids formed after 2 days at 25° C. | 22 |

TABLE 2-continued

Low Temperature Stability

| Example | Temperature & Day Solids were First Observed | Total # of Days without Solids |
|---|---|---|
| 7 | Solids formed after 1 day at 26° C. | 14 |
| 8 | Solids formed after 1 day at 26° C. | 14 |

The low temperature stability testing results illustrate the effect of the intermediate isocyanate value of the uretonimine-modified isocyanate composition on the low temperature stability of the MDI isocyanate blend composition. Blends prepared from uretonimine modified isocyanate having an intermediate isocyanate value in the range of 23.5 to 24.2 have significantly enhanced stability.

Examples 7 and 8, which were prepared with commercially available uretonimine-modified isocyanate compositions as the intermediate composition has a significantly shorter period of days without solids. In other words, the uretonimine-modified isocyanate composition of Examples 7 and 8 are less stable than the uretonimine-modified isocyanate composition of Examples 4-6. As such, achieving the intermediate isocyanate value of from about 23.0 to about 26.0 with the intermediate composition impacts the stability of the final uretonimine-modified isocyanate composition.

Figure 4:
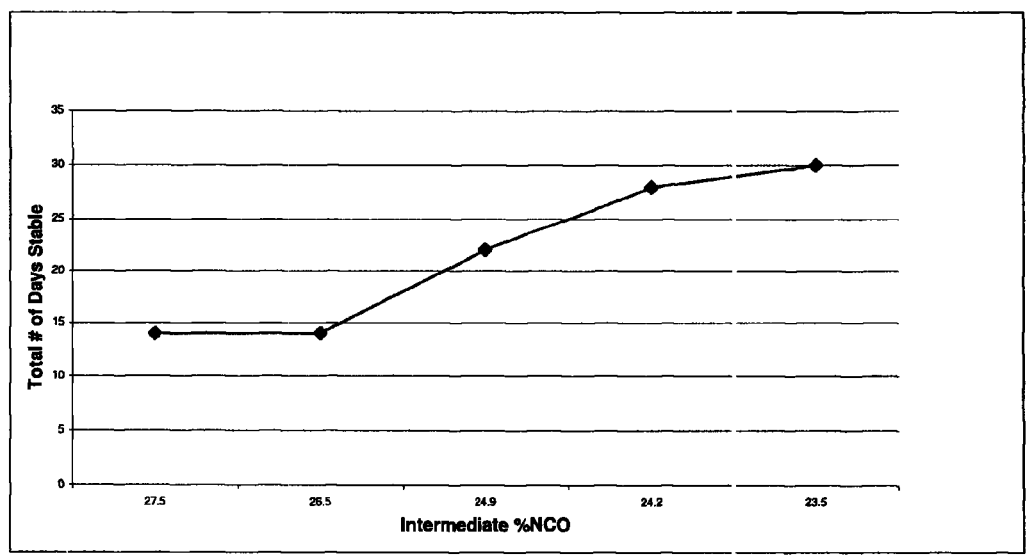
FIG. 4 is a graph of stability of the uretonimine-modified isocyanate composition versus intermediate isocyanate value of the intermediate composition.

FIG. 4 is a graph of the results of Examples 4 through 8. From the graph, the number of days sharply increases as the intermediate isocyanate value becomes lower than 26.5 and begins to level off around 23.5. Additional studies demonstrate that uretonimine-modified compositions with intermediate isocyanate values as low as 21.0 also afford final compositions with good low temperature stability as taught by the subject invention. Thus, it is desirable to produce the intermediate composition having the intermediate isocyanate value of from about 21.0 to about 26.0.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of producing a uretonimine-modified isocyanate composition having increased low-temperature tolerance, said method comprising:
providing a first polyisocyanate composition having two or more isocyanate groups and comprising 4,4'-diphenylmethane diisocyanate (MDI);
reacting the first polyisocyanate composition at a temperature of from about 90° C. to about 115° C. and in the presence of a catalyst such that the isocyanate groups form carbodiimides for forming uretonimine and uretonimine oligomers;
quenching the reaction of the first polyisocyanate composition with a quenching agent to produce an intermediate composition having an intermediate isocyanate value of from about 23.0 to about 25.0; and
combining the intermediate composition with a second polyisocyanate composition in an amount sufficient that the uretonimine-modified isocyanate composition has a final isocyanate value of from about 29.5 to about 33.5.

2. A method as set forth in claim 1 wherein the step of combining the intermediate composition with the second polyisocyanate composition is further defined as combining in weight ratio of the intermediate composition to the second polyisocyanate composition of from about 1:9 to about 1:99.

3. A method as set forth in claim 2 wherein the second polyisocyanate composition comprises about 90 to about 98 parts by weight 4,4'-MDI and about 2 to about 10 parts by weight of at least one of 2,4'-MDI, 2,2'-MDI, and polymeric MDI, both based on 100 parts by weight of the second polyisocyanate composition.

4. A method as set forth in claim 1 further comprising adding a third polyisocyanate composition to the intermediate composition in an amount sufficient to produce the intermediate composition having an intermediate isocyanate value of from about 24.5 to about 25.5.

5. A method as set forth in claim 4 wherein the first polyisocyanate composition comprises 4,4'-MDI in an amount of from about 85 to less than 99 parts by weight based on 100 parts by weight of the first polyisocyanate composition.

6. A method as set forth in claim 5 wherein the first polyisocyanate composition comprises at least one of 2,4'-MDI, 2,2'-MDI, and polymeric MDI in an amount of greater than 1 to about 15 parts by weight based on 100 parts by weight of the first polyisocyanate composition.

7. A method as set forth in claim 6 wherein the first polyisocyanate composition and the third polyisocyanate composition comprise the same isocyanate type.

8. A method as set forth in claim 1 wherein the step of quenching the reaction is further defined as quenching the reaction to produce the intermediate composition having a ratio of 3-functional uretonimine to higher-functional uretonimine oligomers of from about 0.15 to about 0.87.

9. A method as set forth in claim 1 wherein the quenching agent is an acid or an acid generator.

10. A method as set forth in claim 1 wherein the quenching agent is selected from the group of hydrochloric acid, methanesulfonic acid, toluenesulfonic acid, sulfuric acid, acetic acid, oxalic acid, citric acid, formic acid, ascorbic acid, benzoic acid, thiophenol, peracetic acid, benzoyl chloride, trifluoromethanesulfonic acid, perchloric acid and mixtures thereof.

11. A method as set forth in claim 1 wherein the quenching agent is selected from the group of trifluoromethanesulfonic acid, perchloric acid, or mixtures thereof.

12. A method as set forth in claim 1 wherein the quenching agent is present in an amount of from about 1 to about 500 parts per million based on the total amount of uretonimine-modified isocyanate composition.

13. A method as set forth in claim 1 wherein the step of reacting the first polyisocyanate composition is further defined as reacting the first polyisocyanate composition at a temperature of from about 100° C. to about 110° C.

14. A method as set forth in claim 13 wherein the step of reacting the first polyisocyanate composition is further defined as reacting the first polyisocyanate composition at a temperature of about 105° C.

15. A method as set forth in claim 1 wherein the catalyst is present in an amount of from about 1 to about 500 parts per million based on the total amount of the uretonimine-modified isocyanate composition.

16. A method as set forth in claim 1 wherein the catalyst is selected from the group of phospholene, phospholene oxide, phospholidine, phospholidine oxide, phosphate esters, phosphine oxides, and mixture thereof.

17. A uretonimine-modified isocyanate composition having increased low-temperature tolerance, said uretonimine-modified isocyanate composition comprising:
   an intermediate composition having an intermediate isocyanate value of from about 23.0 to about 25.0 comprising the reaction product of a first polyisocyanate composition having two or more isocyanate groups and comprising 4,4'-diphenylmethane diisocyanate (MDI) reacted at a temperature of from about 90° C. to about 115° C. and in the presence of a catalyst such that the isocyanate groups form carbodiimides for forming uretonimine and uretonimine oligomers; and
   a second polyisocyanate composition comprising about 90 to about 99 parts by weight 4,4'-MDI and about 1 to about 10 parts by weight of at least one of 2,4'-MDI, 2,2'-MDI, and polymeric MDI, both based on 100 parts by weight of the second polyisocyanate composition;
   wherein said intermediate composition and said second polyisocyanate composition are present in a weight ratio of said intermediate composition to said second polyisocyanate composition of from about 1:9 to about 1:99 and wherein said uretonimine-modified isocyanate composition has a final isocyanate value of from about 29.5 to about 33.5.

18. A composition as set forth in claim 17 wherein said first polyisocyanate composition comprises 4,4'-MDI in an amount of from about 85 to less than 98 parts by weight based on 100 parts by weight of said first polyisocyanate composition.

19. A composition as set forth in claim 18 wherein said first polyisocyanate composition comprises at least one of 2,4'-MDI, 2,2'-MDI, and polymeric MDI in an amount of greater than 1 to about 15 parts by weight based on 100 parts by weight of the said polyisocyanate composition.

20. A composition as set forth in claim 19 further comprising a third polyisocyanate composition added to said intermediate composition in an amount sufficient to produce said intermediate composition having an intermediate isocyanate value of from about 24.5 to about 25.5 prior to adding the second polyisocyanate composition.

21. A composition as set forth in claim 20 wherein said first polyisocyanate composition and said third polyisocyanate composition comprise the same isocyanate type.

22. A composition as set forth in claim 17 wherein said intermediate composition has a ratio of 3-functional uretonimine to higher-functional uretonimine oligomers of from about 0.15 to about 0.87.

* * * * *